(12) United States Patent
Song et al.

(10) Patent No.: US 11,727,137 B2
(45) Date of Patent: Aug. 15, 2023

(54) PREDICTIVE UPDATE OF PROFILE DATABASE WITH UPDATE LOGIC

(71) Applicant: Visa International Service Association, San Francisco, CA (US)

(72) Inventors: Hongqin Song, Austin, TX (US); Yu Gu, Austin, TX (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 17/710,536

(22) Filed: Mar. 31, 2022

(65) Prior Publication Data

US 2022/0229926 A1 Jul. 21, 2022

Related U.S. Application Data

(63) Continuation of application No. 16/380,715, filed on Apr. 10, 2019, now Pat. No. 11,314,881.

(51) Int. Cl.
*G06F 21/62* (2013.01)
*G06N 3/08* (2023.01)
(Continued)

(52) U.S. Cl.
CPC ........ *G06F 21/6218* (2013.01); *G06F 21/316* (2013.01); *G06N 3/08* (2013.01); *G06N 20/00* (2019.01)

(58) Field of Classification Search
CPC .... G06F 21/00; G06F 21/552; G06F 21/6218; G06F 21/316; H04L 63/14;
(Continued)

(56) References Cited

U.S. PATENT DOCUMENTS

2010/0094767 A1* 4/2010 Miltonberger ......... G06Q 10/10
705/348
2011/0238575 A1* 9/2011 Nightengale ...... G06Q 20/4016
705/44
(Continued)

OTHER PUBLICATIONS

U.S. Appl. No. 16/189,565, filed Nov. 13, 2018.
Hochreiter et al., "Long Short-Term Memory", Neural Computation, vol. 9, No. 8, Nov. 1997, pp. 1735-1780.

*Primary Examiner* — Richard A McCoy
(74) *Attorney, Agent, or Firm* — Kilpatrick Townsend & Stockton LLP

(57) ABSTRACT

Methods and systems are provided to efficiently update account profiles based on a predicted likelihood of use, including by ranking the account profiles according to the likelihood of use. The disclosed system can considerably improve the processing time to update account profiles with the most recent information available, including new access requests. An authentication platform receives a plurality of new access requests, including request data and account identifiers associated with account profiles. The request data is transmitted to a prediction engine that determines a ranking of the account identifiers based on a predicted likelihood of use during a next time interval. A profile batch scheduler retrieves a first set of access requests based on the ranking. The system updates a first set of account profiles based on the ranking, and stores the updated account profiles for use by the authentication platform.

20 Claims, 8 Drawing Sheets

Risk Profile System

(51) Int. Cl.
*G06N 20/00* (2019.01)
*G06F 21/31* (2013.01)

(58) Field of Classification Search
CPC ............ H04L 63/1433; H04L 63/1425; G06Q 20/4016; G06N 20/00; G06N 3/08
See application file for complete search history.

(56) References Cited

U.S. PATENT DOCUMENTS

| | | | |
|---|---|---|---|
| 2015/0004926 A1* | 1/2015 | AlHazme | H04M 1/72424 455/566 |
| 2015/0026027 A1* | 1/2015 | Priess | G06Q 10/04 705/35 |
| 2015/0088733 A1* | 3/2015 | Monastyrsky | G06Q 20/382 705/39 |
| 2016/0019668 A1* | 1/2016 | Kilinski | G06F 40/205 705/325 |
| 2016/0307201 A1* | 10/2016 | Turgeman | G06F 21/316 |
| 2016/0364728 A1* | 12/2016 | DeLawter | G06F 21/6218 |
| 2016/0379266 A1* | 12/2016 | Jagota | G06Q 30/0269 705/14.66 |
| 2017/0091773 A1* | 3/2017 | Amancherla | G06F 21/552 |
| 2017/0161614 A1* | 6/2017 | Mehta | G06N 20/00 |
| 2017/0366561 A1* | 12/2017 | Petersen | H04L 63/1433 |
| 2019/0130327 A1* | 5/2019 | Carpenter | G06F 9/45558 |
| 2020/0234305 A1* | 7/2020 | Knutsson | G06F 17/153 |

* cited by examiner

Risk Profile System

PREDICTIVE UPDATE OF PROFILE DATABASE WITH UPDATE LOGIC

CROSS REFERENCE TO RELATED APPLICATIONS

This application is a continuation application of U.S. patent application Ser. No. 16/380,715, filed Apr. 10, 2019, which is herein incorporated by reference in its entirety for all purposes.

BACKGROUND

An authentication platform may determine the risk of fraud for access to a resource (e.g., a computer behind a firewall). Such an authentication platform can use the data pertaining to the current access request and determines risk based on an account profile. The profile can include statistical data, such as a number of access requests.

To be as accurate as possible, such account profiles may be updated daily. Due to the large number of accounts that must be updated, it may take a significant amount of computing resources and/or wall time to update all of the profiles, and the time required may grow with the number of accounts. Typically, account information is retrieved sequentially based on numerical index value (e.g., account number). While such an account update is in process, the old profiles are used, which can cause inaccuracies when analyzing a new transaction using the "stale" information (e.g., an account profile from the previous day). Moreover, because transactions may be processed globally, there may be no optimal downtime for performing the update.

BRIEF SUMMARY

Methods and systems are provided to efficiently update account profiles stored in one database based on raw data in another larger database, e.g., in distributed storage. The updating can be based on a predicted likelihood of use of an account profile during a specified time period. As an example, the account profiles can be ranked based on the predicted likelihood of use, where the ranking is used to retrieve the raw data from the distributed storage for updating certain account profiles before updating other account profiles. The disclosed system can considerably improve the efficiency and delay time to update the most useful account profiles so as to incorporate the most recent information available, such as new access requests. In this manner, when an access requests is received, there is a greater probability that the account profile will have current data as opposed to stale data.

In an embodiment, an authentication platform receives a plurality of new access requests, including request data and account identifiers associated with account profiles. The request data is transmitted to a prediction engine that determines a ranking of the account identifiers based on a predicted likelihood of use during a next time interval. A profile batch scheduler retrieves a first set of access requests (e.g., the account profiles can be selected based on the ranking, such as those having a highest ranking). The system updates a first set of account profiles, and stores the updated account profiles for use by the authentication platform.

In an embodiment, the system can continue to update account profiles in tiers or bands (e.g., based on the ranking). Specifically, while the updated first set of account profiles are stored for use by the authentication platform, the profile batch scheduler can retrieve a second set of access requests corresponding to a second set of account identifiers (e.g., having a lower ranking than the first set of account identifiers).

In some embodiments, the prediction engine can predict the likelihood of use based on a machine learning (ML) model, such as a recurrent neural network including long short-term memory networks (LSTMs). This ML model can use inputs based on the access request and/or an associated account (e.g., the account initiating the request) such as an account identifier, a request time, a merchant or resource provider associated with the request, or a value of the request. The ML model can provide an output comprising a probability that an account identifier falls within a respective band of the ranking.

In some embodiments, the prediction engine can predict the likelihood of use by updating an existing prediction based on the plurality of new access requests. For example, the prediction engine can update the existing prediction by forming a weighted combination of a new prediction based on the plurality of new access requests and the existing prediction. In another example, the prediction engine can update the existing prediction using a Kalman filter.

In some embodiments, the first set of access requests retrieved can include both existing access requests (e.g., from the distributed storage) and new access requests (e.g., received by the authentication platform).

In some embodiments, the request data can be transmitted to the prediction engine further via a messaging system. In particular, the messaging system can generate a message indicating the new access requests and send the message to the prediction engine. The prediction engine can receive the message and, in response, update the predicted likelihood of account identifiers associated with the new access requests.

These and other embodiments of the disclosure are described in detail below. For example, other embodiments are directed to systems, devices, and computer readable media associated with methods described herein.

A better understanding of the nature and advantages of embodiments of the present disclosure may be gained with reference to the following detailed description and the accompanying drawings.

TERMS

Figure 1:
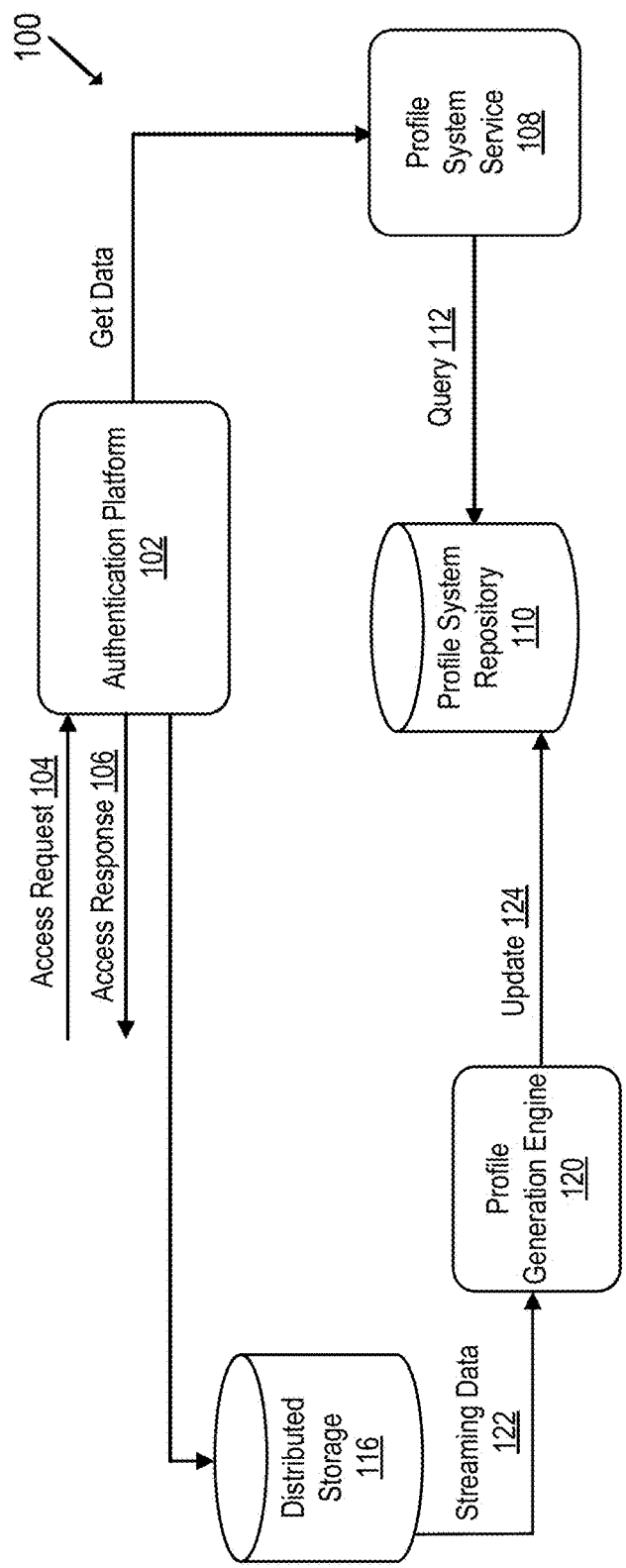
FIG. 1 illustrates a block diagram of an example system for authenticating an access request that may be improved.

Prior to discussing embodiments of this disclosure, description of some terms may be helpful in understanding the embodiments.

A "user device" may comprise any suitable electronic device that may be transported and operated by a user, which may also provide remote communication capabilities to a network. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of user devices include mobile phones (e.g. cellular phones), PDAs, tablet computers, net books, laptop computers, personal music players, hand-held specialized readers, etc. Further examples of user devices include wearable devices, such as smart watches, fitness bands, ankle bracelets, rings, earrings, etc., as well as automobiles with remote communication capabilities. A user device may comprise any suitable hardware and software for performing such functions, and may also include multiple devices or components (e.g. when a device has remote access to a network by tethering to another device—i.e. using the other device as a modem—both devices taken together may be considered a single user device).

A "user" may include an individual. In some embodiments, a user may be associated with one or more personal accounts and/or mobile devices. The user may also be referred to as a cardholder, account holder, or consumer.

A "historical transaction database" can include a database for transaction data for many accounts (e.g., over 1000, 10,000, 100,000, 1 million, or the like) and the transaction data can be permanently stored in the database. If data is purged from the historical transaction database, it can be purged after a long period of time (e.g., transactions over 1, 5, 10 years old, etc.). The historical transaction database may utilize disk storage of the same device as a cache, or local and/or disk storage of one or more devices that are remote with respect to the device providing the cache. Generally, the historical transaction database may utilize storage that is not as quickly accessed as the cache discussed herein.

A "risk score" may include a value associated with an amount of risk. In some embodiments, a risk score may include an arbitrary designation or ranking that represents the risk that a transaction may be fraudulent. The risk score may be represented by a number (and any scale), a probability, or in any other relevant manner of conveying such information.

A "resource provider" may be an entity that can provide a resource such as goods, services, information, and/or access, e.g., to a computer or a building. Examples of a resource provider includes merchants, access devices, secure data access points, etc. A "merchant" may typically be an entity that engages in transactions and can sell goods or services, or provide access to goods or services. A resource provider may operate a computer to perform operations, which can also be generically referred to as a "resource provider computer".

An "authorizing entity" may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the consumer. An authorizing entity may operate a computer to perform operations, which can also be generically referred to as an "authorizing entity computer".

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

DETAILED DESCRIPTION

Methods and systems are provided to efficiently update account profiles to make it likely that access requests are associated with accounts with updated profiles (i.e., to make cache hits likely). In particular, the system can predicted a likelihood of use for accounts, and rank associated account identifiers based on a predicted likelihood of use. The system further can selectively update account profiles based on the predicted likelihood and/or the ranking. The disclosed system can considerably improve the efficiency and delay time to update account profiles so as to incorporate the most recent information available, including new access requests.

In typical examples, although there may be many accounts, the usage distribution of the accounts may be sharply peaked, so that a small percentage of the accounts constitute a large majority of the access requests. Accordingly, the disclosed system efficiently updates account profiles based on predicting the likelihood of use. The system can include a prediction engine that learns patterns of account usage from historical data, e.g. with a machine learning (ML) model, and predicts the usage likelihood accordingly. The system can then generate and/or update account profiles for those accounts that have high likelihood of usage. For instance, account profiles that are accessed more frequently can be updated first, thereby increasing the likelihood that the account profile corresponding to an access request will have current data.

I. Updating Account Profiles

An online authentication platform may determine a likelihood that a request from a user device is authentic. The authentication platform can determine or contribute to a determination of whether the request is fraudulent (e.g., an attacker) or whether a user device should be granted access to a resource (e.g., a computer behind a firewall). Such an authentication platform can use the data pertaining to a current access request (also referred to herein as a risk request or transaction; e.g., the data can include a resource being accessed, addresses, IP address, etc.) to determine a risk that the access request is fraudulent. Such an assessment for a particular request for an account can use information related to historical requests for that account, e.g., using statistical values derived from the historical requests. Such statistical values can be stored in account profiles, which are updated periodically, e.g., every day, week, month, etc. The account profile can include statistical data, such as a number of transactions in a recent time period (e.g., the past hour or day), or a total currency amount, as well as other velocity metrics. In some embodiments, the authentication platform may evaluate other risks related to the access request, such as a likelihood of default.

A. Authentication Platform in Batch Profile Update System

FIG. 1 illustrates a block diagram of an example system 100 for authenticating an access request that may be improved. In various embodiments, risk profile system 100 may be a distributed system, for example comprising multiple servers, or may be a single computer system with multiple components or modules. In this example, authentication platform 102 (also referred to as an authorization platform) receives an access request 104 and provides an access response 106, which can indicate whether a user device should be granted access to a resource. For example, access response 106 (also referred to herein as a risk response) may be an authorization to proceed with the access or a denial. Alternatively, such a response can be used along with other information as part of a final determination. The final determination may be made by another computer. In some embodiments, authentication platform 102 may send data from its determination to the other computer that makes the final determination, and then receive the final response, which can be included as or in access response 106.

In some embodiments, the access requests are for accessing an electronic resource, e.g., a file or a computer. In other embodiments, the access requests are for accessing a physical area, such as a building. In another embodiment, authentication platform 102 may be an online risk-scoring platform or server, and access request 104 may be an online transaction, such as with a credit card or payment credentials, via a user device, etc. Alternatively, access request 104 may be an onsite credit card transaction at a merchant location. In some embodiments, access request 104 can include details of the access request and/or an associated account (e.g., the account initiating the request), such as an account identifier (e.g., a PAN), information pertaining to a user associated with an account, a request time, a merchant or resource provider associated with the request, or a value of the request.

In providing the access response 106, authentication platform 102 preferably assesses the risk of access request 104 with optimal accuracy and efficiency. In order to do so, authentication platform 102 can refer to a profile system service 108 and/or a profile system repository 110 of system 100 to obtain an account profile associated with the access request 104. In particular, profile system service 108 can send a query 112 to profile system repository 110 for the relevant account profile(s), and can send these profile(s) to authentication platform 102. Authentication platform 102 can then use the obtained account profile(s) to evaluate the risk of authorizing request 104. In some embodiments, query 112 can have a requirement for high performance querying, i.e., authentication platform 102 may require a rapid response to query 112 in order to make a timely access response 106. For example, in a typical embodiment, authentication platform 102 provides access response 106 in real time as large numbers of consumers wait to make purchases. For example, thousands of total access requests (e.g., transactions) might be made globally each second.

After processing an access request, authentication platform 102 can send access information associated with the request to distributed storage 116, which can be a historical transaction database. In various embodiments, distributed storage 116 can include cloud-based storage, Apache Hadoop, MapReduce, or another distributed storage system, and may be used to store access request records. Accordingly, when a new access request has completed and been processed, system 100 can send records of the access request to distributed storage 116. In an embodiment, the stored access request records can include details and/or inline metadata such as access request times, requested amounts, outcomes associated with the access request, etc.

B. Account Profile Generation and Storage

To be as accurate as possible, the account profiles may be updated daily. Due to the large number of accounts that must be updated, it may take a significant amount of computing resources and/or wall time to update all of the profiles, and the time required may grow with the number of accounts. Typically, account information may be indexed or retrieved based on identifiers. While such an account update is processed, the old profiles may be used, which can cause inaccuracies when analyzing a new transaction using the "stale" information (e.g., an account profile from the previous day). Moreover, because transactions may be processed globally, there may be no optimal downtime for performing the update.

The generated account profiles and/or other data retrieved from the access request records can be received by profile generation engine 120, also referred to as a message consumer, via the messaging queue. For example, a batch process may send a message including the records to profile generation engine 120. In an embodiment, profile generation engine 120 also can receive streaming data 122 directly from distributed storage 116. Profile generation engine 120 can use this raw data to generate account profiles, also referred to as statistical data, which it can then use to update 124 a store of account profiles in profile system repository 110. Profile system service 108, profile system repository 110, and profile generation engine 120 may be referred to collectively as a profile system. In some embodiments, system 100 can also use a scheduler to manage the generation and/or updates of the account profiles, e.g. via a Bank Identification Number (BIN) code.

In some embodiments, authentication platform 102 can also communicate with profile system service 108, profile system repository 110, and/or another component of system 100 in order to provide system 100 with data relating to new access requests, such as access request 104. In particular, system 100 may update the profiles periodically or at regular intervals to include the latest access requests and/or their outcomes. As a result, data from authentication platform 102 can be incorporated into profile system repository 110. In addition, system 100 may update the access requests stored in distributed storage 116 with the latest access requests. Thus, in some embodiments, authentication platform 102 must also communicate with distributed storage 116.

Profile system repository 110 can store account profiles for all active accounts globally. Typically, the number of such accounts may be in the millions or greater. These profiles may be updated regularly, e.g. daily, in order to incorporate the latest information, such as new access request 104. Conventionally, the entire repository 110 may be updated, and the update may take a significant amount of computing time. For example, the update process may take several hours of wall time. Therefore, if all the account profiles are updated daily, the update may have a significant probability (e.g., 10% or more) of being underway at any given time.

Moreover, because of the volume of active accounts, and their distribution globally, there may not be any optimal downtime for performing the update. That is, access requests may be distributed relatively homogenously throughout the day (e.g., thousands of access requests may occur each second). The conventional risk profile system 100 may also update the account profiles in a homogeneous fashion that does not depend on account usage; for example, risk profile system 100 may update the profiles in random order or according to a predetermined order. In another example, profile system 100 updates the profiles in an order based on a BIN associated with the account. Accordingly, using a conventional risk profile system 100, there may be a significant probability that any given access request is evaluated during the update procedure, and based on outdated or stale profile data.

II. Efficient Systems for Updating Account Profiles

Using the disclosed system and methods, it is possible to significantly reduce the amount of time practically required to update the account profiles most likely to be used. Specifically, the usage distribution of accounts is typically sharply peaked, so that a small percentage of the accounts constitute a large majority of the access requests. By predicting the accounts likely to be used, the system can update only the profiles associated with the accounts likeliest to be used, or can update these profiles first, before completing the update on the rest of the profiles.

Accordingly, a system is provided herein to efficiently update account profiles based on a predicted likelihood of use. In particular, the disclosed system may rank the account profiles based on the predicted likelihood of use. The disclosed system can considerably improve the processing time needed to update account profiles so as to incorporate the most recent information available, such as new access requests.

A. Account Usage Distribution

Figure 2:
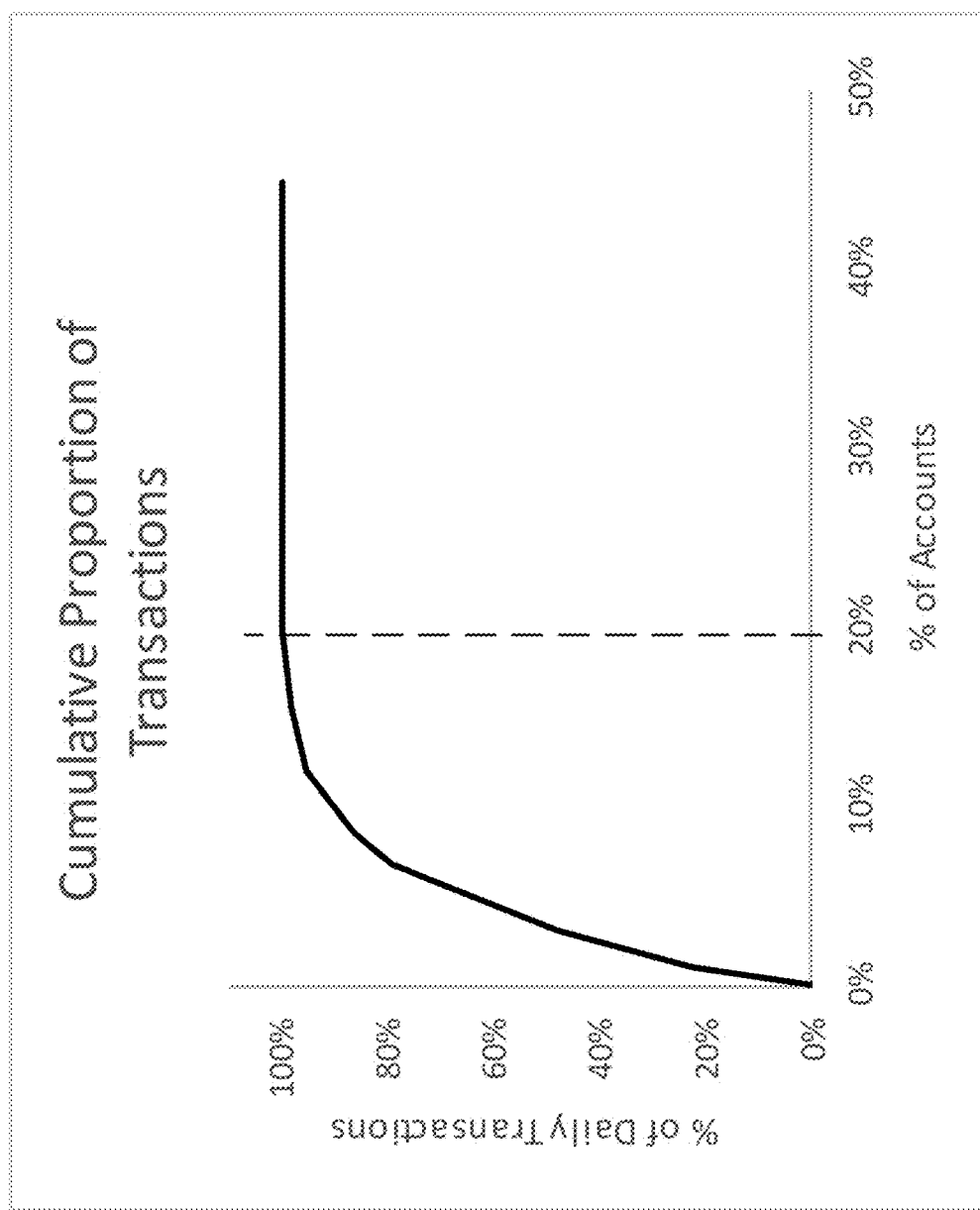
FIG. 2 illustrates an example cumulative probability distribution for account usage.

FIG. 2 illustrates an example cumulative probability distribution 200 for account usage. Cumulative probability distribution 200 shows an example of the cumulative percentage of total transactions as a function of the percentage of the total accounts. Cumulative probability distribution 200 may refer to the percentage of total access requests occurring in a given time period (e.g., a day, ten days, or a year). In particular, cumulative probability distribution 200 may refer to the time period over which the account profiles are updated in the risk profile system (e.g., a day), as described above.

As shown, cumulative probability distribution 200 is very steep at low percentages of the total accounts, and levels out rapidly. Specifically, cumulative probability distribution 200 shows that the top 10% of the accounts initiate roughly 90% of all access requests, while the top 20% of accounts initiate 100% of the access requests occurring in the time period. Thus, the remaining 80% of accounts are unused during the time period.

As a result, it is possible for the system to save a significant amount of computing time by updating a small percentage of the profiles associated with the accounts most likely to be used, or by updating these profiles first. For example, the system may update the profiles associated with the top 1%, 3%, 5%, 7%, 10%, or 20% of accounts, or may update these profiles first, and subsequently continue to update the remaining profiles. In this example, updating the top 20% of accounts would likely encompass all the accounts used in a given day. Even if the system requires the same computing time as a conventional system to complete updating all the remaining profiles, by completing the top account profiles first, it virtually ensures that the accounts are up-to-date by the time they are used.

Updating a fraction of the total account profiles can reduce the required computing time by approximately the same fraction. For example, suppose that a conventional update of the full profile repository takes four hours of wall time. When a given access request occurs, it is likely to be initiated by one of the top 10% or 20% of accounts. However, conventionally, the account profiles are unranked and unsorted, so the initiating account could be found anywhere in the profile repository. Therefore, the elapsed time before the initiating account's profile is updated is distributed uniformly over the four-hour period, and accordingly has a mean value of two hours.

By contrast, using the disclosed system and methods, the average delay time before a given access request's account profile is updated is dramatically reduced. For example, suppose that the system updates the account profiles in the order of the ranking, but eventually does update the full repository. In particular, suppose that the system updates a tier including the top 10% of all account profiles, and then subsequently updates a second tier including the remaining 90% of account profiles. In this example, the average delay time T would be given by a probabilistic formula based on the probability $P_a$ of usage: $T=T_0/2$ [a $P_a+(1-a)$ $(1-P_a)$]. Here, $T_0$ is the total update time, a is the proportion of top account profiles updated, and $P_a$ is the proportion of access requests occurring during the day that were initiated by the top a accounts. For example, with $T_0=4$ hours, a=10%, and $P_a=90\%$, T is roughly 22 minutes. Thus, the average delay time T is 82% lower compared to the conventional value, $T_0/2$.

Note that this formula assumes that a given account profile associated with an account in the top a accounts is distributed uniformly within these top accounts. However, in some embodiments, this may not be the case. For example, suppose a=20%, and $P_a=100\%$, as in the example of FIG. 2 above. However, in the example of FIG. 2, the top 10% of accounts initiate roughly 90% of all access requests, as discussed above. Thus, even within the top a accounts, a given access request may be overwhelmingly likely to be initiated by a smaller subset of the accounts. Hence, in some embodiments, further reduction in the average delay is possible by using multiple tiers of profile updates (e.g., first updating the top 5%, then the next 15%, and finally the remaining 80% of account profiles). Alternatively, in some embodiments, further reduction in the average delay is possible by updating the account profiles according to the order of ranking, even within the tiers.

Note also that while the distribution shown in FIG. 2 may remain accurate from one time period to another (e.g., the distribution may resemble FIG. 2 on any given day), the composition of the top accounts can potentially differ. For example, the accounts comprising the top 10% or 20% of accounts may vary from one day to another. Accordingly, the disclosed system and methods can predict which accounts are likeliest to be used in a coming time period, based on multiple factors. The system can rank all the accounts based on their predicted likelihood of use. Using such predicted rankings, the system can update the top accounts, or can proceed to update the accounts in the order of the ranking. In some embodiments, the system can compare the predictions to actual usage, and thus can improve its predictions over time.

B. System for Efficient Risk Profile Updates

Embodiments can take advantage of certain account profiles being accessed more frequently than other account profiles. For instance, account profiles that are accessed more frequently can be updated first, thereby increasing the likelihood that the account profile corresponding to an access request will have current data. To this end, embodiments can perform a prediction of which account profiles will be accessed during a next time period and/or which account profiles will be accessed the most, thereby determining which profiles are most likely to be needed during the update process.

Figure 3:
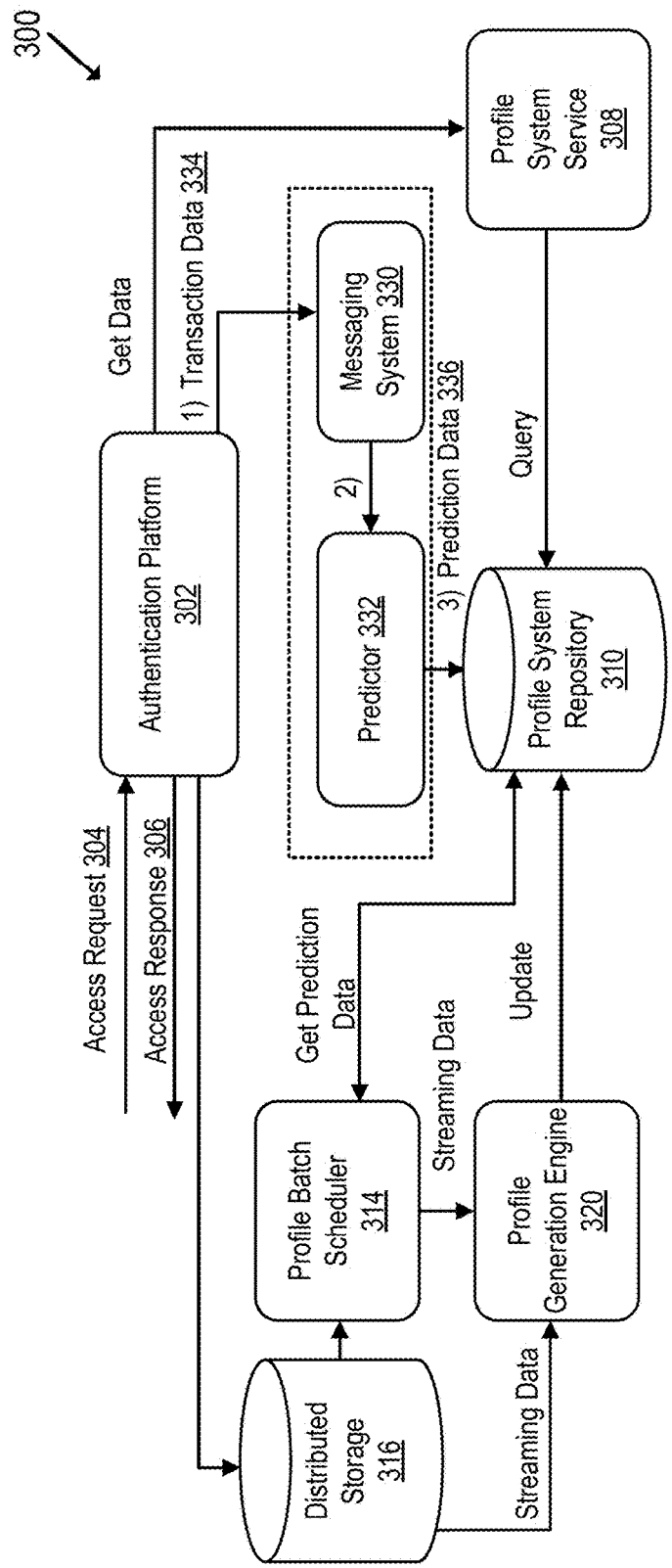
FIG. 3 illustrates a block diagram of a system for determining access responses and updating account profiles based on a ranking of account usage probability, according to an embodiment.

FIG. 3 illustrates a block diagram of a system 300 for determining access responses and updating account profiles based on a ranking of account usage probability, according to an embodiment. In various embodiments, risk profile system 300 may be a distributed system, for example comprising multiple servers, or may be a single computer system with multiple components or modules. In some embodiments, risk profile system 300 may also be distributed geographically, and/or may receive data, such as access requests, from geographically distributed sources. Similarly to system 100 in the example of FIG. 1, system 300 includes an authentication platform 302, a profile system service 308, a profile system repository 310 (e.g., a database), a profile batch scheduler 314, a distributed storage 316, a profile generation engine 320, and a batch risk scoring platform 326.

1. Authentication Platform

As in the example of FIG. 1, authentication platform 302 can receive access request 304 and provide access response 306 by referring to profile system service 308 and/or profile system repository 310 to obtain account profiles. In some embodiments, the access requests are for accessing an electronic resource, e.g., a file or a computer. In other embodiments, the access requests are for accessing a physical area, such as a building. In another embodiment, authentication platform 302 may be an online risk-scoring platform or server, and access request 304 may be an online transaction, such as with a credit card, via a user device, etc. Alternatively, access request 304 may be an onsite credit card transaction at a merchant location.

Authentication platform 302 can respond to a requesting entity (such as an online or physical merchant, a resource provider, a computer, or a security system for a physical facility) with access response 306. Access response 306 may be an authorization to proceed with the requested access, or be a denial. Authentication platform 302 can determine its access response 306 based at least in part on the most recent available data stored in the account profile of one or more accounts involved in the access request. Accordingly, authentication platform 302 may request data, such as account profiles, from profile system service 308 and/or from profile system repository 310. Likewise, batch risk scoring platform 326 can also query profile system service 308 to obtain data 328 for computing risk scores.

Alternatively, in some embodiments, access response 306 can be used together with other information as part of a final determination. In some embodiments, the final determination may be made by another computer. For example, authentication platform 302 may send data from its determination to another computer, and then receive the final response from the other computer. This response can then be included as or in access response 306.

In various embodiments, authentication platform 302 may base the access response 306 on an estimated likelihood that the access request is fraudulent and/or other estimated likelihoods related to the access request, such as a likelihood of default. This likelihood may be estimated by authentication platform 302, batch risk scoring platform 326, or another computer, and/or may be stored within the account profile, and is not limited by the present disclosure. Thus, in various examples, authentication platform 302 may base access response 306 on a decision it makes completely in real time, or partly on a risk assessment included in the relevant account profile.

In an example, authentication platform 302 can base the access response 306 directly on the estimated likelihood, for example by comparing the estimated likelihood to a predetermined threshold. Alternatively, the access response 306 can be based indirectly on the estimated likelihood, such as by combining the estimated likelihood with details of the particular access request (e.g., whether the access request matches a typical pattern of the account).

2. Updating Account Profiles Using a Batch Scheduler

System 300 may include a profile batch scheduler 314. Profile batch scheduler 314 can retrieve records, such as access request records, from distributed storage 316. In various embodiments, profile batch scheduler 314 may update the records in response to a trigger at predetermined times, or on demand, and can receive the data as a single file, or in batches. In an embodiment, profile batch scheduler 314 can also send commands to distributed storage 316 specifying requested data. As described above, distributed storage 316 can include cloud-based storage, Apache Hadoop, MapReduce, or another distributed storage system, and may be used to store access request records. The stored access request records can include details such as transaction times, requested amounts, outcomes, etc. The system can store each access request or transaction in its own record, or can aggregate the access requests.

In an embodiment, profile batch scheduler 314 can send a request to profile system repository 310 for account profiles after getting a trigger to update account profiles. In response to the request, profile system repository 310 may send account profiles to profile batch scheduler 314. In various embodiments, the entire ranked list of account profiles can be sent, or the list can be sent in bands or tiers. For example, profile system repository 310 may retrieve and send a first band or tier with a highest score or ranking, then profile batch scheduler 314 can ask for a second band or tier with a next-highest score or ranking, etc.

Profile batch scheduler 314 can provide data from the retrieved access request records, such as streaming data, to profile generation engine 320. In a typical embodiment, profile batch scheduler 314 transmits the records within a message or via a messaging queue to profile generation engine 320, which is also referred to as a message consumer. In another embodiment, profile generation engine 320 also can receive streaming data 322 directly from distributed storage 316. The records can be transmitted among network nodes via a local network, intranet, or VPN, or via a larger network such as the internet. Alternatively, the records may be transmitted among modules of a single node.

In some embodiments, in place of or in addition to profile batch scheduler 314, system 300 can include a batch process, also referred to as a batch job, and/or a scheduler. The batch process may retrieve records, such as access request records, from distributed storage 316. Based on data retrieved from distributed storage 316, the batch process can generate and/or update account profiles and send the profiles to profile system repository 310. In an embodiment, the batch process sends the profiles on a messaging queue, and/or as streaming data.

Profile generation engine 320 can use such raw data to generate account profiles, also referred to as statistical data. For example, a generated account profile may include data on the number of access requests processed in a recent period (such as the last 30 days), the total currency amount of such recent access requests, the merchant type, the outcomes of recent access requests, etc. Profile generation engine 320 can then use the generated statistical data to update 324 a store of account profiles in profile system repository 310. In various embodiments, profile generation engine 320 can be implemented as a system, such as a server or computer system, or as a software module.

In particular, profile batch scheduler 314 and/or profile generation engine 320 can obtain streaming data and/or access request records according to the usage probability. For example, in various embodiments, profile batch scheduler 314 and/or profile generation engine 320 can obtain data for the top 1%, 3%, 5%, 7%, 10%, or 20% of accounts in a ranking of usage probability. In a typical embodiment, profile batch scheduler 314 can retrieve this data from distributed storage 316, and send a message including the retrieved data to profile generation engine 320, also referred to as a message consumer. In various embodiments, profile batch scheduler 314 can receive the data as a single file, or in batches. Profile generation engine 320 can then update the profiles according to these bands or tiers of accounts, or more generally according to the rankings or predictions. For example, profile batch scheduler 314 may update the profiles in the top bands or tiers of accounts first, and then subsequently continue to update the remaining profiles.

The system can use the profiles to determine the risk of a particular access request. For example, either the authentication platform 302 or the batch risk scoring platform 326 can make use of the account profiles to determine a risk associated with a respective account, or with an access request from a respective account. In some embodiments, the account profiles can themselves include an estimate of risk associated with the respective accounts, or other analyzed or aggregated data.

3. Usage Likelihood Prediction

System 300 can also include other components, such as messaging system 330 and predictor 332, which may use machine learning (ML). As disclosed herein, such additional components can be configured to predict the likelihood of usage of the accounts and update their associated profiles. For example, authentication platform 302 can send access request data 334 relating to the new access requests to messaging system 330. In an embodiment, when a new access request occurs, the system can put a message into a queue. Messaging system 330 can then generate and send a message to predictor 332, also referred to as a consumer or message consumer. Predictor 332 can predict the probability of usage of some or all of the accounts based on an ML model, such as a recurrent neural network (RNN) or Long Short-Term Memory Unit (LSTM) model. In some embodiments, predictor 332 generates or updates a prediction for each new access request. In some embodiments, predictor 332 can instead generate or update a prediction periodically, for example once daily. In an embodiment, predictor 332 and/or the ML model can represent this probability of usage as a score. Upon updating the ranking, predictor 332 may store the ranking, which may be subsequently used by the profile batch scheduler to determine which account profiles to generate or update.

The predictor 332 can be run for a period, e.g. several days, in order to capture a memory of the operations within the model before being used in production. During operation, the predictor can incorporate feedback related to the accuracy of previous predictions.

In an embodiment, the predictor 332 and/or the ML model can rank the accounts based on the probability of usage. Predictor 332 can then send prediction data 336 to profile system repository 310. In particular, if the likelihood score for a next usage is high, the system can save the data in the profile system. In some embodiments, the system can store the top-ranked account profiles in the profile system repository 310. For example, the system can store the profiles of the top-ranked portion a of accounts, where a is a configurable fraction.

In addition, predictor 332 and/or profile system repository 310 can transmit the predicted ranking, the predicted usage probabilities, and/or a probability that the accounts will fall into particular bands or tiers within the ranking to the profile batch scheduler 314. In some embodiments, profile batch scheduler 314 may first request the ranking and/or some or all of the predicted usage probabilities from predictor 332. The profile batch scheduler 314 or profile generation engine 320 can use this information to generate and/or update account profiles based on the usage probabilities. For example, the system may generate and/or update account profiles for a configurable fraction of the top-ranked accounts, or may generate or updated the profiles in the order of the ranking. Profile batch scheduler 314 or profile generation engine 320 can then send the new or updated account profiles to profile system repository to be stored.

III. Prediction Engine

A prediction engine (e.g., predictor 332) can predict the probability of account usage based on an ML model. The prediction engine can learn patterns of account usage, for example, based on recent historical data, and can use these patterns to determine the likelihood of usage for each account, for example, in the next day.

A. Machine Learning System

Figure 4:
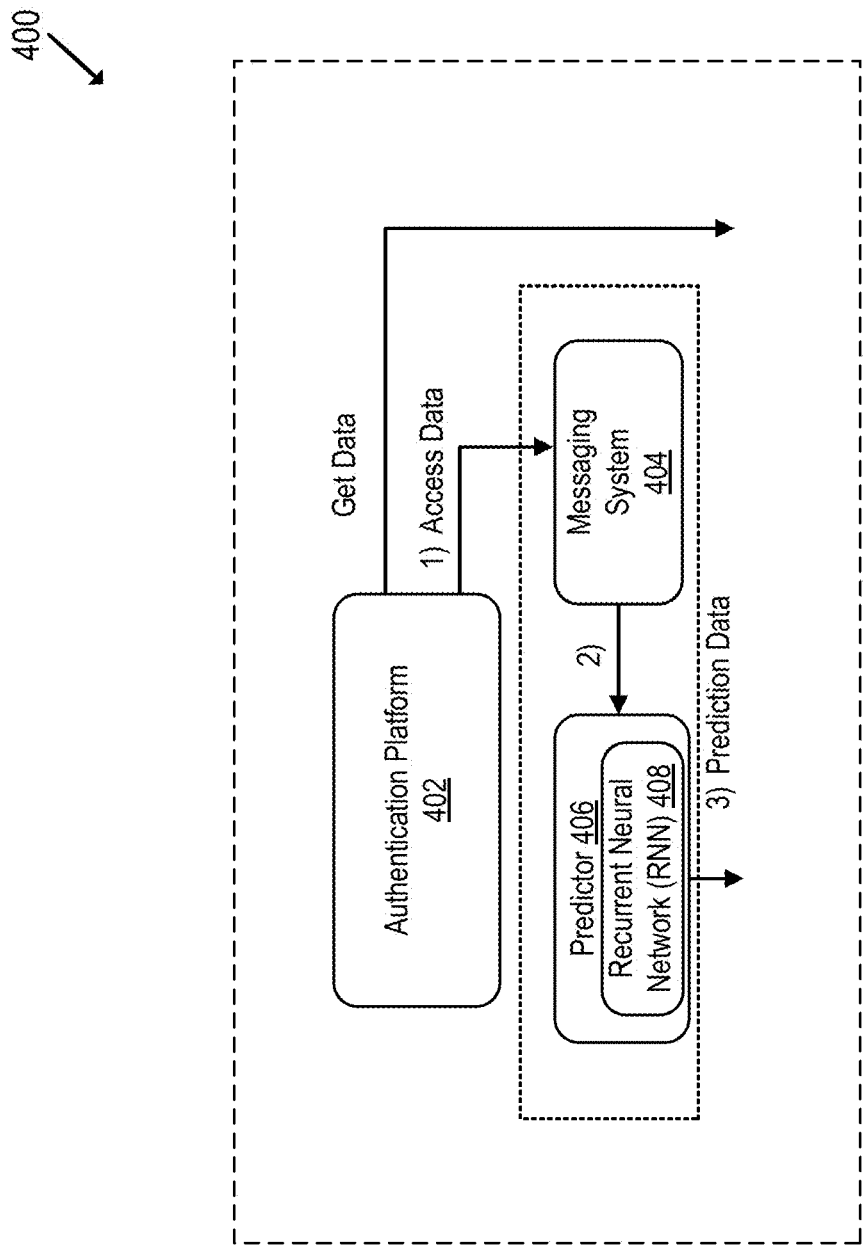
FIG. 4 illustrates a detailed view of a machine learning (ML) system for ranking account usage probability, according to embodiments of the present disclosure.

FIG. 4 illustrates a detailed view of an ML system 400 for ranking account usage probability, according to embodiments of the present disclosure. As described in the example of FIG. 3, authentication platform 402 can send access request data relating to new access requests to messaging system 404. In an embodiment, when a new access request occurs, the system can put a message into a queue. Messaging system 404 can then generate and send a message to predictor 406, also referred to as a consumer or message consumer. Upon receiving the message, predictor 406 may update the usage likelihood predictions and rankings, and may store the updated rankings, which may be subsequently used by the profile batch scheduler to determine which account profiles to update. Predictor 406 may include recurrent neural network (RNN) 408.

In various embodiments, the prediction engine can generate a new prediction, or can update an existing prediction taking into account the new access request data. In particular, the predictor 406 can update the model's internal state and/or weights after each new access request. However, the overall architecture of the model may be updated less frequently. For example, the model architecture can be updated periodically, such as monthly. For each invocation of the RNN model, LSTM gates, such as analog gates on gated cells, can control the update of internal states.

In an embodiment, the model can be trained via supervised learning. For example, the system can use the new data to train the model. In embodiments where the model architecture is updated periodically, the same training procedure could be used.

In the case that the prediction engine updates an existing prediction after a new access request, the system can update the existing prediction to take into account the new access request data. However, in some embodiments, the prediction engine may do so by updating a current or existing stage, which in turn has been generated based on previous access request data. Thus, in effect, the system may update the prediction as a weighted mixture of predictions based on the old and new access request data. In some embodiments, the prediction engine may in fact mix the new prediction based on the new access requests with the existing prediction, i.e. by forming a weighted combination of the new and existing predictions. For example, a linear combination might be formed of an old average with a relative weight of 0.8, and a new average with a weight of 0.2 Alternatively, the system can make use of a filter (e.g., a Kalman filter) to combine the new and existing predictions. In some embodiments, the system does not need to retrieve further access request data from the distributed storage, and instead updates the existing prediction based on the new access requests received from the authentication platform. In some embodiments, the access request data can include the profile of the associated account, in order to allow the authentication platform to evaluate the access request risk.

B. LSTM and ML Model

In various embodiments, predictor 406 may implement an RNN model 408, such as a Long Short-Term Memory Unit (LSTM) model, or may implement another ML model, and is not limited by the present disclosure. The LSTM may also be referred to as a long short-term memory network. An RNN 408 can use inputs including its own earlier outputs, thereby potentially providing the model with both short-term and long-term memory in the RNN's hidden state. For example, such earlier outputs may be provided as inputs to a subsequent layer. In a typical example, these outputs may include the model state and the likelihood of next usage. A function such as a logistic sigmoid function, rectified linear function, or hyperbolic tangent (tanh) function may be used to modulate weights and/or the hidden state.

The LSTM may solve a vanishing gradient problem associated with RNNs. In particular, LSTMs may use analog gates on gated cells to store information. LSTMs may make use of a hyperbolic tangent (tan h) layer to convert cell states into vectors of new candidate values, in the range between −1 and 1, to be possibly added to the state. Accordingly, the gated cells may include a sigmoid neural net layer, such as an input gate layer, which can determine which values will be updated. In particular, the sigmoid layer can output a value between 0 and 1 that specifies how much of a given component may pass through the gate. The gates may further include a pointwise multiplication operation, that multiplies the vectors from the tanh layer by the sigmoid layer output, thereby selecting the components to be updated.

Through learning, the gated cells can regulate the flow of information. Accordingly, LSTMs can maintain a stable error value, thereby allowing the model to learn accurately over many time steps and produce accurate weighting of inputs over time.

In particular, such gates can control the update of internal states. In an embodiment, the system may update the model's internal state and/or weights after receiving each new access request, using gates to control the updated components and/or values of the state.

The implemented model may use inputs including details and/or inline metadata of an access request event, such as a PAN, an access request time, a merchant, a transaction amount, information pertaining to a user associated with an account, etc. The model may itself determine the model inputs during a training stage. This can include both temporary and longer-term inputs.

In some embodiments, each new access request may be a trigger for the model to generate or update the predicted usage likelihoods and/or the ranking of account profiles. Alternatively, the model may instead generate or update the usage predictions periodically, for example daily. Upon updating the ranking, the system may store the ranking, which may be subsequently used by the profile batch scheduler to determine which account profiles to generate or update.

In an embodiment, the model may output a probability that an account identifier, such as a PAN, is in a particular band or tier in the ranking. For example, the bands or tiers can include the top 1%, 3%, 5%, 7%, 10%, or 20% of accounts by usage likelihood in the coming period (e.g., in the next day, or until the next batch update of the account profiles). Alternatively, the model may output the usage probability or the most likely ranking. The prediction may be a binary classification, such as whether or not a given account will make an access request in the coming period (e.g, within the next day). The model may generate such a ranking in response to each new access request.

The RNN model state may have one or multiple layers, for example via a deep learning model. For each layer, the model may maintain an internal state including the topology or connectivity of these layers, and the weight of each node.

In some embodiments, the predictor may learn a separate model for each account, or alternatively one model with multiple weights or state layers for the multiple accounts. This may provide superior performance compared to conventional ML models because the disclosed system can learn the individual account usage patterns, as well as qualitative information such as how the account is used. For example, the model may learn that an account requests authorization for a transaction at a particular merchant at regular times, such as purchasing food in a cafeteria.

The system can further learn correlations among accounts, and can connect the separate models or states to provide a final output. In particular, the models for the multiple accounts may be connected by embedding. For example, embedding can learn correlations among accounts, between accounts and merchants, and other permutations thereof. In another example, the model may learn that a group of accounts tend to make similar requests at similar times, or that the usage of two accounts is correlated or anti-correlated (e.g., if one user or account-holder uses multiple accounts for similar purchases, or typically uses a second account after reaching a monthly threshold usage of a first account). Such embedding can be part of the input learned in an outline, which can be provided to the ML model to finalize the final state and output.

IV. Methods

Disclosed herein are methods to significantly reduce the amount of time practically required to update the account profiles most likely to be used. Specifically, the disclosed methods can predict the usage likelihood of accounts, and subsequently update profiles associated with the accounts likeliest to be used. Furthermore, the methods can communicate new access requests to a prediction engine in order to predict the usage likelihood, and can communicate the predicted ranking as well as historical access requests in order to update account profiles and make access decisions.

A. Methods for Updating Account Profiles

Figure 5:
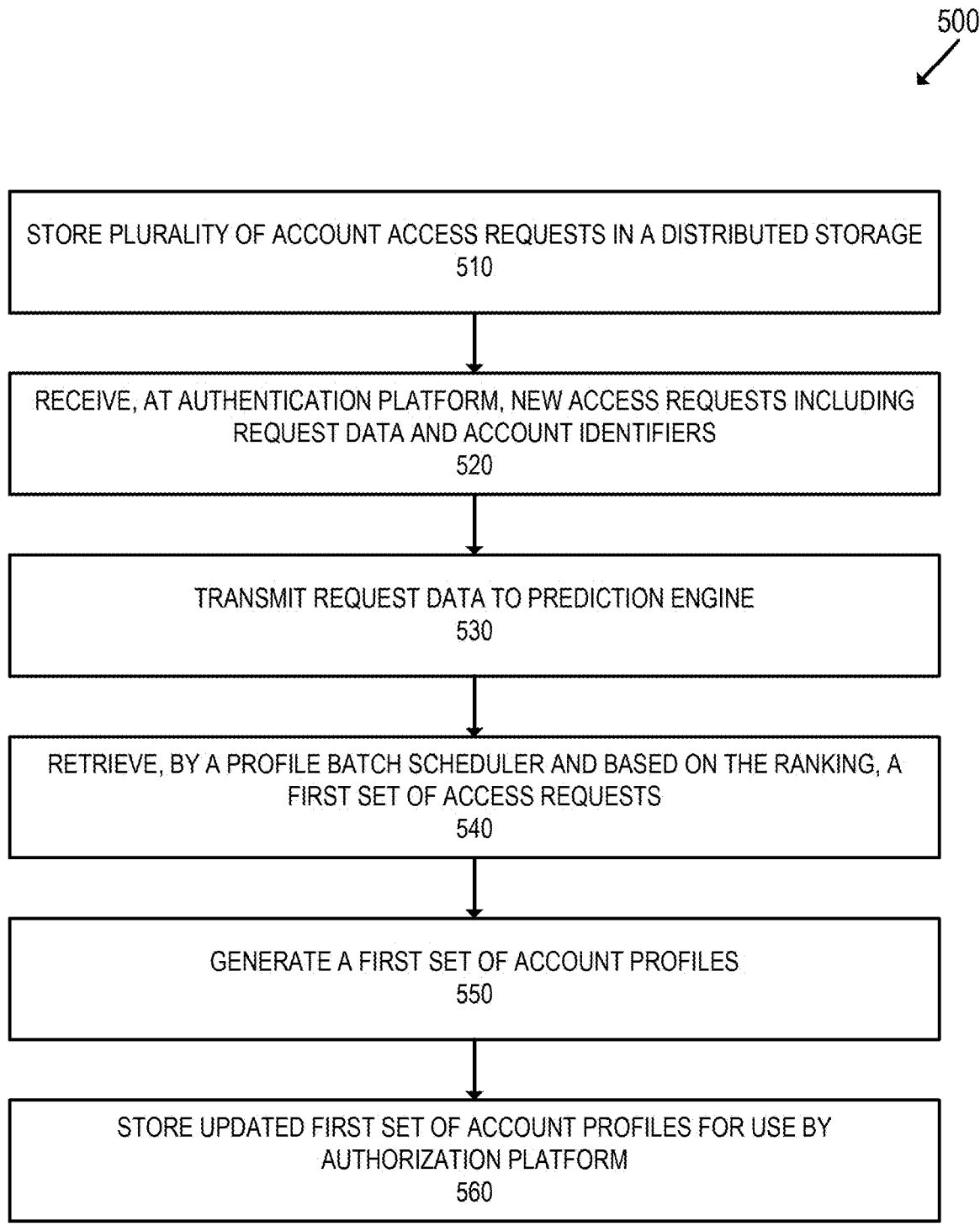
FIG. 5 is a flow diagram of a method for selectively updating account profiles based on a ranking of account identifiers and a predicted likelihood of use, in accordance with embodiments of the present disclosure.

FIG. 5 is a flow diagram of a method 500 for selectively updating account profiles based on a ranking of account identifiers and a predicted likelihood of use, in accordance with embodiments of the present disclosure. Method 500 may be performed in a system such as system 300 of the example of FIG. 3.

At step 510, the system can store a plurality of account access requests in a distributed storage. For example, the distributed storage can include cloud-based storage, Apache Hadoop, MapReduce, or another distributed storage system. In an embodiment, the distributed storage may store all access requests occurring over a recent time period, such as the previous three months or the previous six months. Alternatively, the storage can include a longer time period, and is not limited by the present disclosure.

At step 520, the system can receive, at an authentication platform, new access requests including request data and account identifiers. These new access requests may include the latest access requests, which may not yet have been incorporated into the distributed storage. In an embodiment, the authentication platform may be an online risk-scoring platform, and the new access requests may be online transactions. The system may incorporate records of the new requests into the distributed storage. In various embodiments, the authentication platform can transmit the new request information to the distributed storage via a direct connection, or via another route.

At step 530, the system can transmit the new request data to a prediction engine, such as predictor 406 in the example of FIG. 4. In various embodiments, the prediction engine can generate a new prediction, or can update an existing prediction taking into account the new access request data. As described above, the authentication platform may send the new access request data to a messaging system, which can put a message into a queue. The message may then be received by the prediction engine, which can estimate a probability of usage for the accounts, incorporating the new access request data. In particular, in response to receiving the message, the prediction engine can update a predicted usage probability of one or more accounts associated with one or more of the new access requests. The prediction engine can further rank the accounts according to their probability of usage in the coming period (e.g., in the next day, or until the next batch update of the account profiles). In an embodiment, the prediction engine outputs a probability that an account identifier is in a particular band in the ranking.

At step 540, a profile batch scheduler of the system can retrieve a first set of access requests, based on the ranking. In various embodiments, the retrieved first set of access requests can include existing access request data, new access request data from the authentication platform, or a mixture of existing and new access requests.

The first set of access requests may correspond to a first set of account identifiers. In some embodiments, the first set of account identifiers may be associated with accounts having the highest ranking from the prediction engine. For example, the bands output by the prediction engine could include the top 1%, 3%, 5%, 7%, 10%, or 20% of accounts. In this case, the profile batch scheduler may retrieve the first set of access requests and/or the first set of account identifiers based on these bands. For example, the profile batch scheduler could select all accounts in one of these bands (e.g., the top 3% of accounts), and could accordingly retrieve all the access requests associated with these selected accounts. Further, the profile batch scheduler could subsequently select a second set of access requests corresponding to a second set of account identifiers having a lower ranking, for example by selecting additional bands.

In some embodiments, in determining which account profiles to generate or update, the profile batch scheduler can make use of the most up-to-date usage likelihood rankings, which may include the newest access requests received at the authentication platform.

At step 550, a profile generation engine or message consumer, such as profile generation engine 320 in the example of FIG. 3, can generate a first set of account profiles. These account profiles can correspond to the first set of account identifiers. An account profile contains the records relevant for computing the risk of a transaction. For instance, a profile may contain data such as a number of access requests associated with the account processed in the last 30 days or 90 days, the types of merchants, merchant identifying information or IP addresses, the total cost of the previous transactions, other velocity metrics, number of recent transactions with a particular merchant or IP address, etc.

In an embodiment, the system can replace or update an existing account profile. Replacing or updating an existing profile, or generating a new profile, will be referred to herein as generating a profile.

At step 560, the system can store the updated first set of account profiles for use by the authentication platform. For example, a profile generation engine, such as profile generation engine 320 in the example of FIG. 3 or a batch process, can use the generated account profiles to update a store of account profiles in a repository, such as profile system repository 310 in the example of FIG. 3. The updated account profiles can subsequently be used by other systems or components. For example, an authentication platform can use the updated account profiles to determine access responses, or a batch risk scoring platform can obtain the updated account profiles, e.g. via a query to a profile system service, to compute an authentication score. In some embodiments, the stored profiles can include aggregated information, such as scores or risk estimates.

B. Methods for Communicating Access Requests

Figure 6:
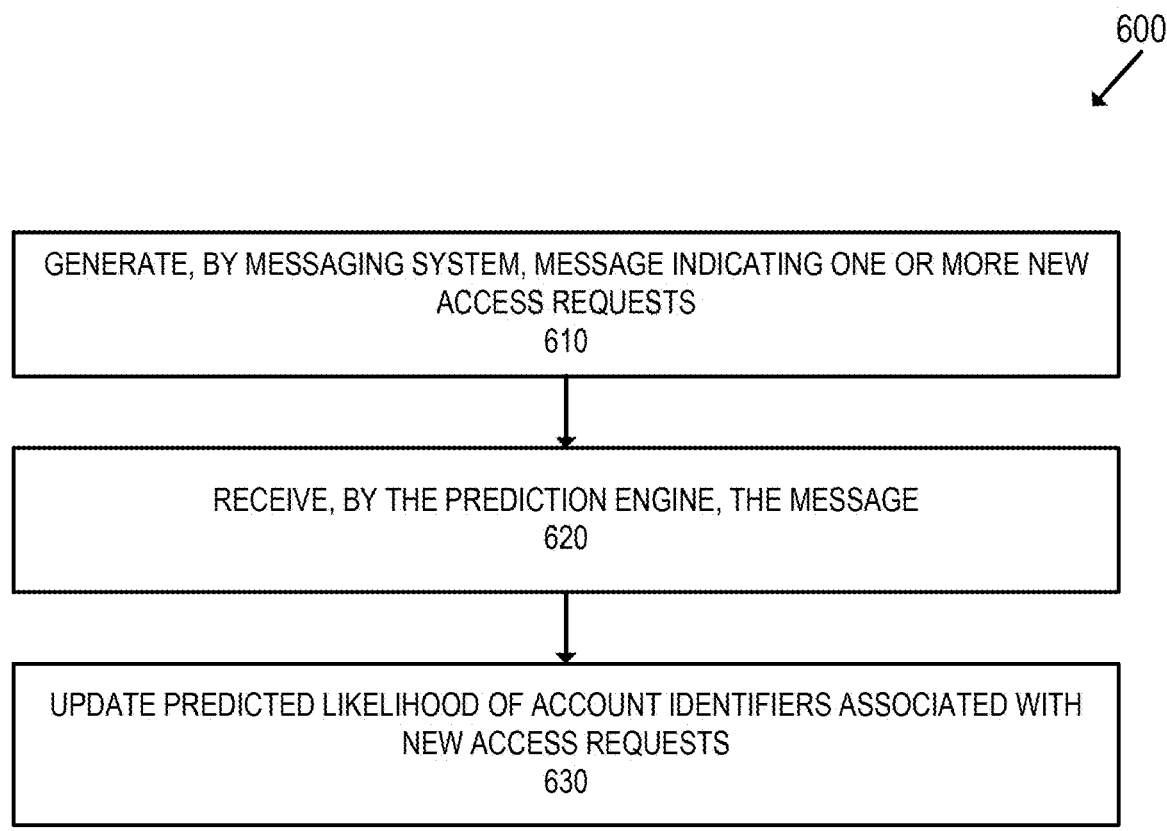
FIG. 6 is a flow diagram of a method for transmitting a message indicating new access requests, in accordance with embodiments of the present disclosure.

FIG. 6 is a flow diagram of a method 600 for transmitting a message indicating new access requests, in accordance with embodiments of the present disclosure. Method 600 may be performed in a system such as system 300 of the example of FIG. 3.

At step 610, a messaging system, such as messaging system 330 in the example of FIG. 3, can generate a message indicating one or more new access requests. In an embodiment, the message may include records relating to the new access requests, such as request times, requested amounts, information about associated merchants or resource providers, outcomes associated with the requests, information identifying user devices associated with the requests, etc. The message and/or records can be transmitted among network servers or nodes via a local network, intranet, or VPN, or via a larger network such as the internet. Alternatively, the message may be transmitted among modules of a single node. The message may be in various formats, such as binary, XML, HTML, JSON, text, or any other human-readable and/or machine-readable format, and is not limited by the present disclosure. In various embodiments, the message may or may not be compressed or encrypted. In some embodiments, instead of discrete messages transmitted at irregular intervals, the messaging system can instead transmit regular messages and/or a continuous data stream. The message can be transmitted directly, such as by point-to-point communication, or can be multicast or broadcast. In an embodiment, the message and/or records can be communicated via shared memory that can be jointly accessible to the authentication platform, messaging system, prediction engine, profile generation engine, and/or other components or modules of the system.

At step 620, a prediction engine, such as predictor 332 in the example of FIG. 3, can receive the message. In various embodiments, the message may be pushed to the prediction engine or pulled by the prediction engine. For example, the prediction engine may check for new messages, periodically, at regular intervals, or by registering to "listen" to the messages in a stream.

At step 630, in response to receiving the message, the prediction engine can update the predicted likelihood of account identifiers associated with the new access requests. The prediction engine can further rank the accounts according to their probability of usage in the coming period (e.g., in the next day, or until the next batch update of the account profiles). In a typical embodiment, the prediction engine can generate or update a usage prediction each time a new access request is received. Alternatively, the prediction engine may instead generate or update predictions after a predetermined number of new access requests, such as a batch of access requests, according to a regular schedule, or in response to any other trigger, and is not limited by the present disclosure.

Figure 7:
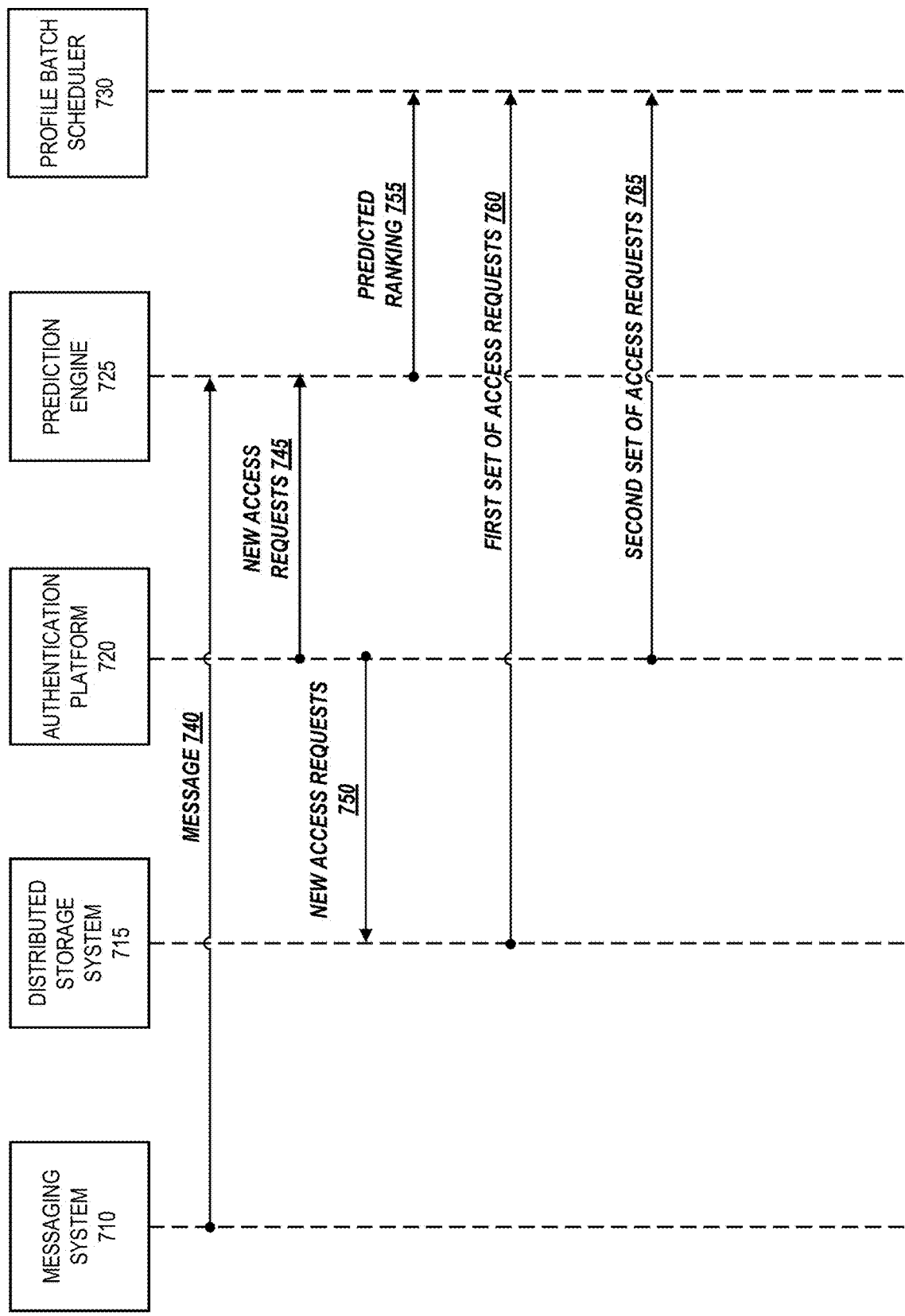
FIG. 7 is a communication flow diagram of a method for updating account profiles based on a ranking, in accordance with embodiments of the present disclosure.

FIG. 7 is a communication flow diagram of a method for updating account profiles based on a ranking, in accordance with embodiments of the present disclosure. The method may be performed by a system such as system 300 of the example of FIG. 3, including a messaging system 710, a distributed storage system 715, an authentication platform 720, a prediction engine 725, and a profile batch scheduler 730. In various embodiments, these components may be separate nodes or servers on a network, or may be hardware components or software modules implemented within a single computer system. In addition, the data and/or messages described herein can be communicated directly between the components, multicast, or broadcast, or can be communicated via shared memory, and are not limited by the present disclosure.

In an embodiment, a message 740 is transmitted from messaging system 710 to the prediction engine 725. In an embodiment, the message may include records relating to the new access requests, such as request times, requested amounts, information about associated merchants or resource providers, outcomes associated with the requests, information identifying user devices associated with the requests, etc. The message may be in various human-readable and/or machine-readable formats, and may be compressed or encrypted. In some embodiments, instead of discrete messages transmitted at irregular intervals, the messaging system can instead transmit regular messages and/or a continuous data stream.

Authentication platform 720 can then transmit new access requests 745 to the prediction engine 725. The transmitted first set of access requests can correspond to a first set of account identifiers. Authentication platform 720 can also transmit new access requests 750 to distributed storage system 715. In an example, distributed storage system 715 can store the new access requests for subsequent use, e.g. by the authorization platform.

Next, prediction engine 725 can transmit a predicted ranking 755 to the profile batch scheduler 730. Prediction engine 725 can determine the likelihood of usage of accounts corresponding to the access requests, e.g. in a period such as the next day, based on an ML model. In particular, prediction engine can output a ranking of the accounts and/or a probability that the accounts will fall into particular bands or tiers within the ranking. In some embodiments, profile batch scheduler 730 may first request the ranking and/or some or all of the predicted usage likelihoods from prediction engine 725.

In some embodiments, profile batch scheduler 730 can request a first set of access requests from authentication platform 720. This request may be based on the output of the prediction engine, such as a ranking. In particular, the first set of access requests may be associated with accounts that are highly ranked and/or in a first tier or band of the ranking. In various embodiments, the requested first set of access requests can include existing access request data, new access request data, or a mixture of existing and new access requests.

Distributed storage 715 can then transmit a first set of access requests 760 to profile batch scheduler 730. In some embodiments, the new access request data can be transmitted directly from the authentication platform to the profile batch scheduler 730. The profile batch scheduler 730 and/or a profile generation engine can then generate account profiles for the highly ranked accounts (e.g., those in a first tier or band of the ranking) and/or the accounts associated with the first set of access requests. In some embodiments, the profile batch scheduler 730 can make use of the most up-to-date rankings, which may include the newest access requests received at authentication platform 720.

Authentication platform 720 may then determine an authentication response to the authentication requests. This response may be determined based on account profile data. For example, authentication platform 720 may request a second set of account profiles in order to evaluate an associated risk and/or to determine the response. Accordingly, a profile system service can transmit a second set of account profiles to the authentication platform 720.

In some embodiments, authentication platform 720 can then receive additional access requests. Finally, authentication platform 720 can transmit a second set of access requests 765 to the profile batch scheduler 730.

V. Computer Apparatus

Figure 8:
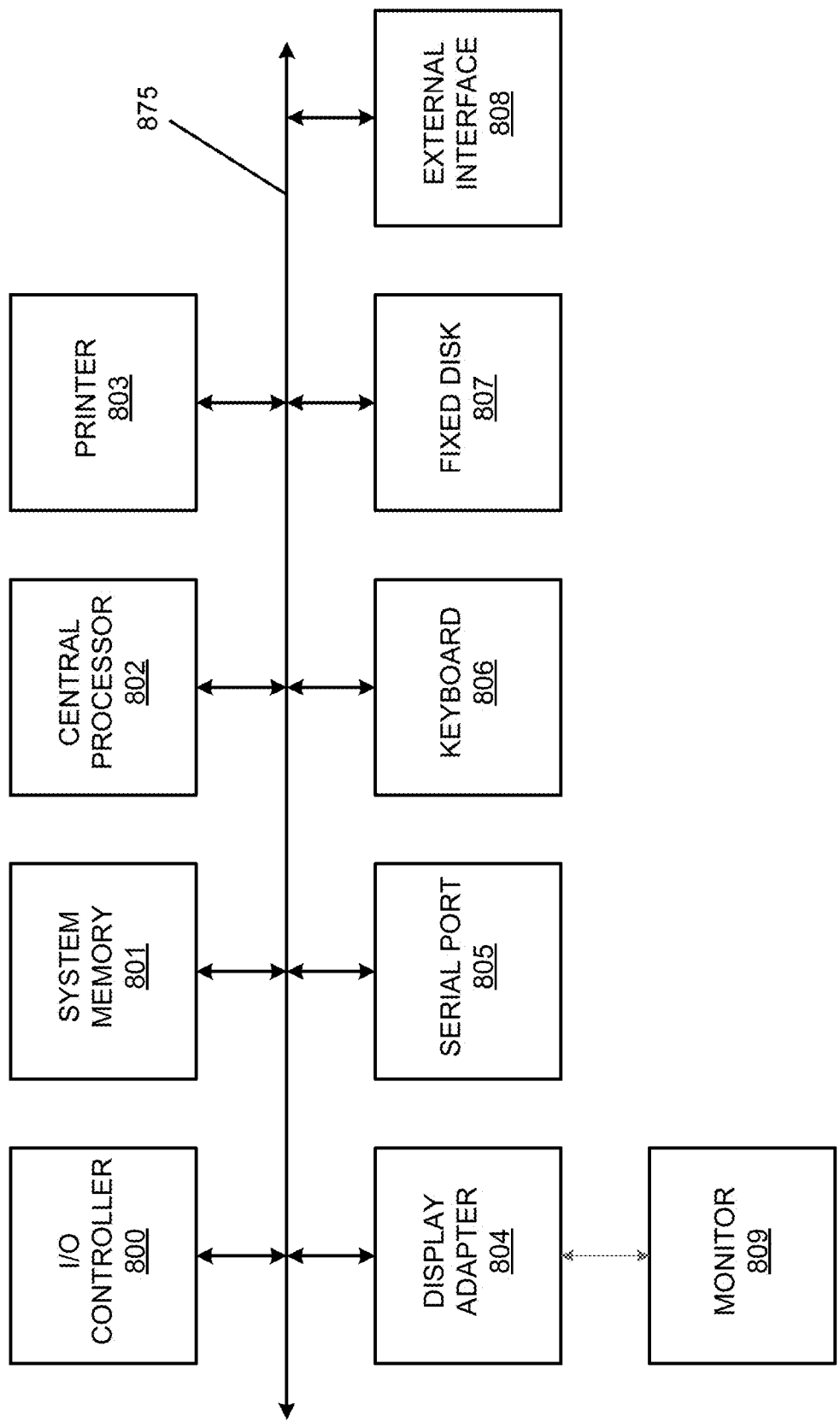
FIG. 8 is a high level block diagram of a computer system that may be used to implement any of the entities or components described above.

FIG. 8 is a high level block diagram of a computer system that may be used to implement any of the entities or components described above. The subsystems shown in FIG. 8 are interconnected via a system bus 875. Additional subsystems include a printer 803, keyboard 806, fixed disk 807, and monitor 809, which is coupled to display adapter 804. Peripherals and input/output (I/O) devices, which couple to I/O controller 800, can be connected to the computer system by any number of means known in the art, such as a serial port. For example, serial port 805 or external interface 808 can be used to connect the computer apparatus to a wide area network such as the Internet, a mouse input device, or a scanner. The interconnection via system bus 875 allows the central processor 802 to communicate with each subsystem and to control the execution of instructions from system memory 801 or the fixed disk 807, as well as the exchange of information between subsystems. The system memory 801 and/or the fixed disk may embody a computer-readable medium.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The above description is illustrative and is not restrictive. Many variations of the invention may become apparent to those skilled in the art upon review of the disclosure. The scope of the invention may, therefore, be determined not with reference to the above description, but instead may be determined with reference to the pending claims along with their full scope or equivalents.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A risk determination method comprising performing, by a computer system:
   receiving, at an authentication platform of the computer system, an access request for a resource, the access request from a user of a plurality of users using a client computer of a plurality of client computers;
   determining a risk of providing access to the resource by retrieving, from a distributed storage, a profile corresponding to the user and analyzing the profile;
   storing, in the distributed storage, raw data from a plurality of historical access requests corresponding to the access request from the plurality of client computers;
   transmitting, by the authentication platform to a prediction engine, request data from a set of access requests from the user and a plurality of different users of the plurality of users, wherein the prediction engine uses the request data to calculate and assign a rank to each profile in a plurality of profiles, wherein each calculated rank corresponds to a respective probability that a next time interval will include a future access request for a corresponding profile of the plurality of profiles;
   selecting a first set of the profiles from a profile repository, the first set corresponding to the highest ranking profiles from the profile repository according to the calculated ranks of the plurality of profiles; and
   for each profile in the first set of the profiles:
      selecting a respective profile;
      retrieving previously stored raw data corresponding to the respective profile from the distributed storage;
      using the retrieved raw data to determine one or more updated value for at least one statistical value;
      updating the respective profile with the one or more determined updated values; and
      storing the updated respective profile in the profile repository,
      whereby a next risk determination corresponding to a next access request has an increased probability of being determined from the corresponding profile updated with corresponding one or more determined updated values more recently based on the corresponding assigned rank than if the corresponding profile were updated in an order of an index to thereby increase accuracy of the next risk determination.

2. The method of claim 1, further comprising:
   while the first set of the profiles are stored for use by the authentication platform, retrieving, by a profile batch scheduler, a second set of access requests corresponding to a second set of the profiles having a lower ranking than the first set of the profiles.

3. The method of claim 1, wherein the prediction engine calculates and assigns the rank to each profile based on a machine learning model.

4. The method of claim 3, wherein the machine learning model comprises a recurrent neural network including long short-term memory networks (LSTMs).

5. The method of claim 3, wherein the machine learning model uses an input comprising one or more of: an access request, an account identifier, a time, a merchant, or a request value.

6. The method of claim 3, wherein the machine learning model provides an output comprising a probability that an account profile falls within a respective band of the ranking.

7. The method of claim 1, wherein the prediction engine calculates and assigns the rank to each profile by updating, based on the request data, an existing prediction.

8. The method of claim 7, wherein the updated prediction comprises one or more of:
   a weighted combination of the existing prediction with a new prediction based on the requests data; or
   a Kalman filter.

9. The method of claim 1, wherein the set of access requests comprises at least an existing access request from the previously stored raw data and at least one of the request data.

10. The method of claim 1, further comprising:
    generating, by a messaging system, a message indicating one or more of the set of access requests;
    transmitting the message to the prediction engine with the request data;
    receiving, by the prediction engine, the message; and
    updating, by the prediction engine in response to the message, the rank of one or more account profiles associated with the one or more of the set of access requests.

11. A computer system comprising:
    one or more processors communicably coupled a distributed storage that stores raw data from a plurality of historical access requests from a plurality of client computers; and a computer readable medium coupled to the processor, the computer readable medium comprising code, executable by the one or more processors, for implementing a risk determination method comprising:

receiving, at an authentication platform of the computer system, an access request for a resource, the access request from a user of a plurality of users using a client computer of the plurality of client computers;

determining a risk of providing access to the resource by retrieving, from the distributed storage, a profile corresponding to the user and analyzing the profile;

transmitting, by the authentication platform to a prediction engine, request data from a set of access requests from the user and a plurality of different users of the plurality of users, wherein the prediction engine uses the request data to calculate and assign a rank to each profile in a plurality of profiles, wherein each calculated rank corresponds to a respective probability that a next time interval will include a future access request for a corresponding profile of the plurality of profiles;

selecting a first set of the profiles from a profile repository, the first set corresponding to the highest ranking profiles from the profile repository according to the calculated ranks of the plurality of profiles; and for each profile in the first set of the profiles:
  selecting a respective profile;
  retrieving previously stored raw data corresponding to the respective profile from the distributed storage;
  using the retrieved raw data to determine one or more updated values for at least one statistical value;
  updating the respective profile with the one or more determined updated values, and store the updated respective profile in the profile repository; and
  storing the updated respective profile in the profile repository,
  whereby a next risk determination corresponding to a next access request has an increased probability of being determined from the corresponding profile updated with corresponding one or more determined updated values more recently based on the corresponding assigned rank than if the corresponding profile were updated in an order of an index to thereby increase accuracy of the next risk determination.

12. The computer system of claim 11, the method further comprising:
while the first set of the profiles are stored for use by the authentication platform, retrieving, by a profile batch scheduler, a second set of access requests corresponding to a second set of the profiles having a lower ranking than the first set of the profiles.

13. The computer system of claim 11, wherein the prediction engine is configured to calculate and assign the rank to each profile based on a machine learning model.

14. The computer system of claim 13, wherein the machine learning model comprises a recurrent neural network including long short-term memory networks (LSTMs).

15. The computer system of claim 13, wherein the machine learning model uses an input comprising one or more of: an access request, an account identifier, a time, a merchant, or a request value.

16. The computer system of claim 13, wherein the machine learning model provides an output comprising a probability that an account profile falls within a respective band of the ranking.

17. The computer system of claim 11, wherein the prediction engine calculates and assigns the rank to each profile by updating, based on the request data, an existing prediction.

18. The computer system of claim 17, wherein the updated prediction comprises one or more of:
  a weighted combination of the existing prediction with a new prediction based on the requests data; or
  a Kalman filter.

19. The computer system of claim 11, wherein the set of access requests comprises at least an existing access request from the previously stored raw data and at least one of the request data.

20. The computer system of claim 11, wherein the method further comprises:
  generating, by a messaging system, a message indicating one or more of the set of access requests;
  transmitting the message to the prediction engine with the request data;
  receiving, by the prediction engine, the message; and
  updating, by the prediction engine in response to the message, the rank of one or more account profiles associated with the one or more of the set of access requests.

* * * * *